United States Patent
Shipley et al.

(10) Patent No.: US 9,580,586 B2
(45) Date of Patent: Feb. 28, 2017

(54) POLYPROPYLENE COMPOUNDS WITH ENHANCED HAPTICS

(71) Applicant: Asahi Kasei Plastics North America, Inc., Fowlerville, MI (US)

(72) Inventors: Katherine M. Shipley, Mason, MI (US); Sameer G. Mehta, Novi, MI (US); Vaibhav Vishnu Apte, Farmington Hills, MI (US); Laura Therese Shereda, Livonia, MI (US)

(73) Assignee: ASAHI KASEI PLASTICS NORTH AMERICA, INC., Fowlerville, MI (US)

( * ) Notice: Subject to any disclaimer, the term of this patent is extended or adjusted under 35 U.S.C. 154(b) by 29 days.

(21) Appl. No.: 14/302,209

(22) Filed: Jun. 11, 2014

(65) Prior Publication Data

US 2014/0288225 A1   Sep. 25, 2014

Related U.S. Application Data

(63) Continuation-in-part of application No. 13/836,167, filed on Mar. 15, 2013, now abandoned.

(60) Provisional application No. 61/736,009, filed on Dec. 12, 2012.

(51) Int. Cl.

| | |
|---|---|
| B01J 19/20 | (2006.01) |
| C08L 23/16 | (2006.01) |
| C08L 53/02 | (2006.01) |
| C08L 53/00 | (2006.01) |
| C08L 23/06 | (2006.01) |
| C08K 3/40 | (2006.01) |
| C08K 7/02 | (2006.01) |

(52) U.S. Cl.
CPC ............. *C08L 23/16* (2013.01); *C08L 23/06* (2013.01); *C08L 53/00* (2013.01); *C08L 53/025* (2013.01); *C08K 3/40* (2013.01); *C08K 7/02* (2013.01)

(58) Field of Classification Search
CPC ......... C08L 23/16; C08L 53/00; C08L 53/025
USPC ....................................... 524/451, 504, 456
See application file for complete search history.

(56) References Cited

U.S. PATENT DOCUMENTS

| | | |
|---|---|---|
| 6,136,415 A | 10/2000 | Spengler |
| 6,300,419 B1 | 10/2001 | Schanobish et al. |
| 6,498,214 B2 | 12/2002 | Laughner et al. |
| 6,949,605 B2 | 9/2005 | Shankernarayanan et al. |
| 7,219,922 B2 | 5/2007 | DePue et al. |
| 8,338,540 B2 | 12/2012 | Van Riel et al. |
| 8,529,821 B2 | 9/2013 | Walia et al. |
| 8,569,412 B2 | 10/2013 | Posch et al. |
| 8,764,028 B2 | 7/2014 | Mann et al. |
| 2007/0037914 A1 | 2/2007 | Heck et al. |
| 2010/0204381 A1 | 8/2010 | Heck |
| 2012/0190784 A1 | 7/2012 | Posch et al. |
| 2013/0037160 A1 | 2/2013 | Ishii et al. |

FOREIGN PATENT DOCUMENTS

| | | |
|---|---|---|
| EP | 2 048 185 B1 | 12/2009 |
| EP | 1 311 608 B1 | 10/2010 |
| EP | 1 896 539 B1 | 12/2010 |
| WO | WO 2007/025663 A1 | 3/2007 |
| WO | WO 2009/047188 A1 | 4/2009 |
| WO | WO 2013/035764 A1 | 3/2013 |

*Primary Examiner* — James J Seidleck
*Assistant Examiner* — Deve E Valdez
(74) *Attorney, Agent, or Firm* — Birch, Stewart, Kolasch & Birch, LLP

(57) ABSTRACT

A polymeric composition is a blend of one or more heterophasic copolymers of propylene and ethylene produced by a multistep polymerization, wherein the heterophasic copolymers comprise a low crystalline matrix component and a soft amorphous elastomeric component, in which both the matrix component and the soft amorphous elastomeric component contain greater than 55% by weight propylene; one or more additional elastomeric components selected from the group of an ethylene/α-olefin $C_3$-$C_{20}$ copolymer with a total ethylene concentration of greater than or equal to 65% by weight; and a propylene/α-olefin $C_2$, $C_4$-$C_{20}$ copolymer with a total propylene concentration of greater than or equal to 65% by weight; 5-65% by weight of the total composition of one or more inorganic or organic reinforcement materials; and 0.01-4% by weight of the total composition of a maleic anhydride grafted polypropylene compatibilizer or coupling agent. The polymeric composition has a low crystallinity of less than 30 J/gram measured by DSC. The total elastomer content of the polymeric composition is greater than 50% by weight, and the overall polymeric composition has an ethylene concentration of greater than 10% by weight.

19 Claims, No Drawings

POLYPROPYLENE COMPOUNDS WITH ENHANCED HAPTICS

PRIORITY CLAIM

This application is a Continuation-in-Part application of pending U.S. application Ser. No. 13/836,167, filed on Mar. 15, 2013, which claims the benefit of U.S. provisional Application No. 61/736,009 filed on Dec. 12, 2012, both of which are incorporated by reference herein.

FIELD OF THE INVENTION

This invention relates to filled polymeric compositions and molded articles produced from the same. More specifically, the invention relates to a blended thermoplastic material that when molded, produces parts with a desirable balance of softness and stiffness, a durable, aesthetically pleasing surface, and a pleasant soft touch feel.

BACKGROUND

In many consumer markets, soft touch surfaces are desirable on parts that are frequently touched. In targeted applications, molded parts must also demonstrate appropriate strength, stiffness, and durability required for the application. Articles fabricated from this invention may include automotive interior trim parts such as door panels, consoles, instrument panels, seat closures, and knee bolsters. Non-automotive parts may include chair arms, seat backs, table edges, grips, handles, and other articles that are frequently touched or desired to have a soft or warm touch.

When an object is touched, sensory information is gathered by the skin, joints, tendons and muscles and conveyed to the brain by the nervous system. Tactile feedback is very complex due to the large amount of simultaneously gathered stimuli, which may also include an emotive response associated with a particular surface. Therefore, it is not surprising that whether a user will find a specific surface "pleasant" is difficult to predict.

One example of the benefits of soft touch haptics is evident in soft interior trim versus traditional rigid materials. In the auto industry, leather interior trim has traditionally been limited to use in high end vehicles. Because of the association of leather and luxury, it is not surprising that the use of materials with similar soft touch feel results in an increase in perceived quality, luxury, and comfort compared to hard plastic. Despite having no relevance to the performance of the vehicle, haptic feedback gathered by touching the trim is often influential in the decision of whether or not to purchase a vehicle.

As a result of the increase in perceived quality of soft interior trim, substantial effort and resources have been channeled into creating synthetic materials and resins with touch surfaces haptics.

It is necessary to develop polymeric resins with an improved surface feel as determined by the end user. Additionally, such resins must be formed by processes that are economical and relatively easy to implement.

Hand or machine wrapped "imitation-leathers" have been created from materials including polyurethanes, polyvinyl chloride, and TPOs to try and capture the quality benefit of soft touch without the expense of leather. The soft skin materials are produced by sheet extrusion or casting films and are subsequently wrapped onto rigid substrates. The resulting films have a desirable feel; however, high scrap rates and labor costs make these materials cost prohibitive.

Another method for producing parts with soft touch haptics is to add a functional coating or over molded material layer onto a thermoformed part. Soft touch paints and topcoats, such as those described in U.S. Pat. No. 6,300,419 and U.S. Pat. No. 6,498,214 can be applied to a thermoformed part to increase surface durability and create the desired feel for thermoformed parts. Over molding soft thermoformed skins to pre-formed rigid substrates is also an option, as described in U.S. Pat. No. 7,219,922 and U.S. Pat. No. 6,136,415. Unfortunately, these processes have high scrap rates and manufacturing costs resulting from expensive tooling modifications or multiple post-molding steps.

An object of the present invention is to prepare a blended thermoplastic material that when molded, produces parts with a desirable balance of softness and stiffness, a durable, aesthetically pleasing surface, and a pleasant soft touch feel with reduced scrap rates and manufacturing costs.

SUMMARY

The present invention meets the above object and relates to an inventive polymeric composition that can be used to form structurally sound parts with surfaces that have a soft touch feel. The polymeric composition is a blend of (a) one or more heterophasic copolymers of propylene and ethylene produced by a multistep polymerization, wherein the heterophasic copolymers comprise a low crystalline matrix component and a soft amorphous elastomeric component, in which both the matrix component and the soft amorphous elastomeric component contain greater than 55% by weight propylene; (b) one or more additional elastomeric components selected from the group of an ethylene/α-olefin $C_3$-$C_{20}$ copolymer with a total ethylene concentration of greater than or equal to 65% by weight; and a propylene/α-olefin $C_2$, $C_4$-$C_{20}$ copolymer with a total propylene concentration of greater than or equal to 65% by weight; and 5-65% by weight of the total composition of one or more inorganic or organic reinforcement materials. The composition also contains 0.01-4% by weight of the total composition of a maleic anhydride grafted polypropylene compatibilizer or coupling agent. The overall blend has a low crystallinity of less than 30 J/gram measured by DSC. Additionally, the total elastomer content of the polymeric composition is greater than 50% by weight, and the overall polymeric composition has an ethylene concentration of greater than 10% by weight.

In one embodiment, the reinforcement material may be glass and optionally one or more inorganic fillers selected from the group consisting of talc, wollastonite, and minerals. In another embodiment, the reinforcement material may be an organic fiber and optionally contains one or more mineral fillers.

In one embodiment, the one or more additional elastomeric components may be selected from the group consisting of styrenic elastomers, hydrogenated styrenic ethylene/butadiene copolymers, ethylene-styrene interpolymers, styrenic diblock, triblock, and star-block copolymers, HSEBS, SEBS, and HSEPS.

In one embodiment, the composition may contain from 0.001-6% by weight of the total composition of one or more additives selected from the group consisting of antioxidants, nucleating agents, anti-scratch additives, stabilizers, UV stabilizers, compatibilizers, polypropylene grafted maleic anhydride coupling agents, colorants, polyamide 6, clarifiers, dispersants, and blowing agents.

In another embodiment, the composition may comprise 0.001-25% by weight of a propylene homopolymer or random copolymer based on the total weight of the composition.

In another embodiment, component (a) may be present as 10-90% by weight of the total weight of the polymer composition. In a preferred embodiment, component (a) may be present as 15-75% by weight of the total weight of the polymer composition. In a more preferred embodiment, component (a) may be present as 25-70% by weight of the total weight of the polymer composition.

The polymeric composition may also include component (b) in an amount of 5-60% by weight of the total weight of the polymer composition.

Another embodiment is directed to a molded article having improved surface feel produced from the composition described above. Trying to relate specific material properties to the overall perceived surface feel is very difficult due to the complexity and sheer amount of stimuli simultaneously emitted from simply touching an object. Therefore, it is not surprising that no single test can predict which surfaces may be considered to be "pleasant" or "desirable." Properties such as tensile strength, flexural modulus, and durometer hardness provide only measures of the bulk properties of the material, neglecting the effect of surface features and unable to predict emotive responses. Coefficient of friction gives an idea of how slippery a surface is, but generally, to determine how a material with specific physical properties is perceived, observers are asked to offer subjective feedback while touching the test surface.

Surprisingly, the present invention demonstrates that the ratio of flexural modulus in MPa to Shore D hardness of the inventive composition provides a very good indication of whether a material will have the desired balance of properties and surface feel for compositions with Shore D hardness ratings less than or equal to 50 and flex modulus between 100-1000 MPa. The molded article may have a ratio of flexural modulus (MPa)/Shore D hardness between 4 and 20. The molded article may have a coefficient of friction between 0.1 and 0.7 according to ISO 8295.

DETAILED DESCRIPTION

Polymeric Composition

In the first embodiment of the invention, a polymeric composition with a soft-touch feel, comprises a blend of:
a. one or more heterophasic copolymers of propylene and ethylene produced by a multistep polymerization, wherein the heterophasic copolymers comprise a low crystalline matrix component and a soft amorphous elastomeric component, in which both the matrix component and the soft amorphous elastomeric component contain greater than 55% by weight propylene;
b. one or more additional elastomeric components selected from the group consisting of:
   i. an ethylene/α-olefin $C_3$-$C_{20}$ copolymer with a total ethylene concentration of greater than or equal to 65% by weight, preferably greater than or equal to 65% by weight; and
   ii. a propylene/α-olefin $C_2$, $C_4$-$C_{20}$ copolymer with a total propylene concentration of greater than or equal to 65% by weight, preferably greater than or equal to 65% by weight;
c. 5-65% by weight of the total composition of one or more inorganic or organic reinforcement materials; and
d. 0.01-4% by weight of the total composition of a maleic anhydride grafted polypropylene compatibilizer or coupling agent.

The polymeric composition has a total crystallinity of less than 30 J/g measured by differential scanning calorimetry (DSC). The total crystallinity is preferably less than 20 J/g and more preferably less than 15 J/g.

The total elastomeric content of the polymeric composition is greater than 50% by weight, preferably greater than 55% by weight, and more preferably greater than 60% by weight. The overall polymeric composition has an ethylene concentration of greater than 10% by weight, preferably greater than 15% by weight.

Heterophasic Copolymer

Heterophasic copolymers (HECO) are polypropylene systems obtained in a process of two or more steps, which results in a multiphase structure of a propylene based matrix and inclusions therein comprised of an amorphous elastomer. Such processes can be tailored by setting the comonomer content in the matrix and in the elastomeric phase based on the desired purposes. However, there are limits established by the processes employed for the manufacture of heterophasic polypropylene with regard to the comonomer content. For instance, if the amount of comonomer content is too high in the first process step (i.e., in a first reactor), it may impede the transfer of the obtained matrix due to stickiness in the transfer lines. The high comonomer content in the composition causes serious problems in the reaction vessels and/or transfer system. The high comonomer content also causes the final product to exhibit tacky behavior. Such tacky products will be not accepted by the customers due to an unpleasant touch feeling.

The blend of the polymeric composition comprises one or more heterophasic copolymers of propylene and ethylene produced by a multistep polymerization. The heterophasic copolymers comprises a low crystalline matrix component and a soft amorphous elastomeric component. The term "low crystalline matrix component" means a matrix component that has a heat of fusion of less than 30 J/g measured according to ISO 11357-1:2009. The term "soft amorphous elastomeric component" means an elastomeric component that has a heat of fusion of less than 20 J/g. The matrix component and the soft elastomeric component contain greater than 55% by weight propylene, preferably greater than 60% by weight propylene, more preferably greater than 65% by weight propylene. The content of the one or more heterophasic copolymers may be 10-90% by weight, preferably 15-75% by weight, and more preferably 25-70% by weight based on the total weight of the polymer composition.

Reactor Thermoplastic Polyolefins (RTPO)

While still being a multistep process, a reactor TPO is a special type of heterophasic copolymer whose production methodology is somewhat different than the production methodology of many heterophasic copolymers. While still having a propylene based matrix, a RTPO may be prepared by polymerization in sequential polymerization stages, where each subsequent polymerization step(s) are conducted in the presence of the polymeric material formed in the immediately preceding polymerization reaction. This process allows a significantly higher amount of elastomer to be incorporated directly into the propylene based matrix in the subsequent polymerization steps and is designed to manage the tackiness associated with these higher elastomer compounds. In these processes, one or more different comonomer compositions can give rise to different polymer structures, each with its own polymer properties such as crystallinity, molecular weight, and molecular weight distribution. Additionally, these heterophasic polyolefin compositions or RTPOs are available to incorporate additional types of elastomers for specific desired properties and are also able to incorporate and retain a high amount of inorganic filler, maintaining a low flexural modulus and soft touch characteristics. A preferred heterophasic copolymer is Hifax CA 10 A Reactor TPO, which is a homopolymer based reactor TPO with 70% propylene rich elastomer content with a MFR of 0.8 g/10 min at 230° C./2.16 kg according to ASTM D1238-13 (Aug. 1, 2013). At least one of the heterophasic copolymers is preferably a reactor TPO.

A preferred heterophasic copolymer is Adflex Q200F, which is a homopolymer based reactor TPO with 70% propylene rich elastomer content with a MFR 0.8 g/10 min at 230° C./2.16 kg according to ISO 1133. Another preferred heterophasic copolymer is Adflex KS 084P, which is similar in composition to Adflex Q200 but is a vis-broken reactor TPO with a MFR of 30 g/10 min according to ISO 1133, and contains 70% propylene rich rubber.

Additional Elastomeric Component

The term "elastomer" or "elastomeric" describes an amorphous phase or a polymer with crystallinity normally less than 5. In this embodiment, elastomers are added to the blend of the polymeric composition to obtain the desired balance of overall properties. The polymeric composition contains one or more elastomeric components selected from the group consisting of:
 i. an ethylene/α-olefin $C_3$-$C_{20}$ copolymer with a total ethylene concentration of greater than or equal to 65% by weight, preferably greater than or equal to 75% by weight, and more preferably greater than or equal to 80% by weight; and
 ii. a propylene/α-olefin $C_2$, $C_4$-$C_{20}$ copolymer with a total propylene concentration of greater than or equal to 65% by weight, preferably greater than or equal to 75% by weight, and more preferably greater than or equal to 80% by weight.

Suitable elastomers may have a melt flow rate not less than 1 g/10 mins as measured at 2.16 kg and 230° C. as measured by ASTM D-1238 (Aug. 1, 2013), and preferably less than 50 g/10 mins. More than one elastomer may be present from either group.

The ethylene rich elastomer (i) preferably contains an α-olefin selected from propylene, butene, hexene, and octene. More preferably, the ethylene elastomer contains an α-olefin selected from butene, hexane, and octene. Most preferably, the ethylene based elastomer contains an α-olefin selected from butene and octene.

The propylene rich elastomer (ii) preferably contains an α-olefin selected from ethylene, butene, hexene, and octene. More preferably, the propylene elastomer contains an α-olefin selected from ethylene, butene, and octene. Most preferably, the propylene elastomer contains an α-olefin selected from ethylene and butene.

In addition to the ethylene rich elastomer (i) and/or the propylene rich elastomer (ii), the additional elastomeric component may further include one or more styrenic elastomers, hydrogenated styrenic ethylene/butadiene copolymers, ethylene-styrene interpolymers, styrenic diblock, triblock, and star-block copolymers, HSEBS, SEBS, and HSEPS. These styrenic elastomers may also contain significant amounts of mineral based oils used to soften this elastomeric phase. Preferred examples of this component include Kraton G1652M, a hydrogenated ethylene/butadiene copolymer with 30% styrene by weight of the total weight of the elastomer, and Kraton G4609H, an oil extended hydrogenated ethylene/butadiene copolymer with a styrene content of 30% by weight of the total weight of the elastomer.

The composition may contain 0-40% by weight, preferably 0.01-35% by weight, more preferably 0.01-25% by weight, of additional elastomeric component based on the total weight of the polymer composition.

Ethylene Based Elastomer (i)

The ethylene based elastomer may contain greater than about 50 wt. %, and preferably greater than about 55 wt. % ethylene monomer based on the total weight of the elastomer. Elastomers may contain less than about 85 wt. %, preferably less than about 80 wt. %, and more preferably less than about 70 wt. % ethylene monomer based on the total weight of the elastomer. The concentration of the higher α-olefin monomer in the ethylene based elastomer may be greater than about 12 wt. %, more preferably greater than 20 wt. %, and most preferably greater than about 30 wt. % based on the total weight of the elastomer. For example, the elastomer may be a copolymer that contains ethylene monomer at a concentration greater than about 50 wt. % and 1-octene monomer at a concentration greater than about 12 wt. % (e.g., greater than about 20 wt. %) based on the total weight of the elastomer. Suitable C2 based elastomers are commercially available from the DOW Chemical Company under the designation of Engage®. A preferred ethylene based elastomer is DOW Engage 8100, which is an ethylene-octene elastomer with a melt flow index (MFI)=1 at 190° C./2.16 kg and a density of 0.870 g/cm$^3$ according to ASTM D792-08 (Jan. 3, 2008).

Propylene Based Elastomer (ii)

The propylene based elastomer selected for the additional elastomeric component may exhibit a Shore D hardness according to ISO 868 (Mar. 1, 2003) of less than 40, more preferably a Shore A hardness less than about 95, preferably a Shore A hardness between 70-90%.

Examples of suitable propylene based elastomers that may be used include soft thermoplastics containing greater than 50 wt. %, preferably greater than about 65 wt. %, more preferably greater than about 70 wt. %, and most preferably greater than about 80 wt. % (e.g., at least 85 wt. %) propylene monomer based on the weight of the polypropylene elastomer and greater than about 5 wt. % ethylene monomer and may be characterized by a peak melting temperature from about 35° C. to about 130° C. (e.g., from about 40° C. to about 110° C.) as measured by differential scanning calorimetry (DSC). Such elastomers are commercially available from the DOW Chemical Company under the designation of VERSIFY® and from ExxonMobil Chemical Company under the designation of VISTA-MAXX®. A preferred propylene based elastomer is Versify 4301, which is a propylene rich rubber with a melt flow rate of 25 g/10 min at 230° C./2.16 kg according to ASTM D1238-13 (Aug. 1, 2013).

Interpolymers

Interpolymers are ethylene/α-olefin polymers that contain a block or segment of the polymer structure having at least one hard block and at least a plurality of soft blocks. These block copolymers are available commercially from Dow Chemical Company under the tradename INFUSE™ and contain ethylene and octene comonomers. A preferred interpolymer is DOW Infuse 9807, an ethylene-octene elastomer with a melt flow index MFI=15 at 190° C./2.16 kg according to ASTM D1238-13 (Aug. 1, 2013) and a density of 0.866 g/cm$^3$ according to ASTM D792-08 (Jan. 3, 2008).

Reinforcement Material

The physical and mechanical properties of polypropylene compounds can be modified or improved by the addition of reinforcing materials. The composition contains inorganic or organic reinforcement material in an amount between 5-65% by weight of the total polymeric composition. The amount is preferably 5-50% by weight of the total polymeric composition and more preferably 10-40% by weight of the total polymeric composition. Inorganic fillers may be selected from a group consisting of mica, clay, siliceous materials, ceramics, glass, sulfate minerals, or mixtures thereof. Some common examples of mineral fillers include mica, talc, kaolin, bentonite, wollastonite and other inert platy materials. The filler may also be organic and may be fibrous or platy in nature.

Glass fiber may present in the form of long or short fibers, chopped strand or continuous glass fibers, ground or milled glass, glass beads, hollow glass beads, glass bubbles or mixtures thereof. Preferably, glass fibers are present in the composition. More preferably, glass fiber is present between 5-40% of the total weight of the composition.

The reinforcement material may be glass and optionally one or more inorganic fillers selected from the group consisting of talc, wollastonite, and minerals. The reinforcement material may be an organic fiber and optionally contain one or more mineral fillers. A preferred reinforcement material is general purpose glass fiber sized and coated for optimal adhesion to polypropylene such as that available from Johns Mansville, Owens Corning, PPG Industries, Nippon Electric Glass (NEG), CPIC (China), or 3B (Belgium).

Coupling Agent

To improve adhesion to glass fibers, polar functionalized compatibilizers or coupling agents may be used to make the inorganic filler materials more organophilic and, therefore, more compatible with the polypropylene matrix. Such materials may be grafted on a polyolefin. Polypropylene homopolymers or alpha olefin copolymers of propylene or ethylene may serve as carriers. The amount of functional grafted coupling agent may be between 1-5% of the total weight of the composition. Maleic anhydride grafted polyolefins are commonly available commercially, which include Polybond 3200 by Addivant and G3003 by Eastman. Other coupling agents can be produced from various organic acids such as carboxylic acids, maleic acid, maleic anhydride, fumaric acid, citraconic acid, itaconic acid, acrylic acid, methacrylic acid, and the anhydrides or esters derived therefrom. Epoxies or silanes may also be used. Maleic anhydride is the preferred coupling agent. The functional grafted maleic anhydride content in the coupling agent is preferably 1-2% by weight based on the total weight of the reagent.

The amount of coupling agent used in the polymeric blend may vary according to the nature of the coupling agent used, but in filled or reinforced polyolefin compositions, the functional organic acid graft is generally present from 0.01-4% by weight of the blend. The loading of coupling agent may vary with the filler concentration and type. Other polymer modifiers may be combined to impart desirable properties such as increased softness and improved surface appearance. Some examples include nylon, high density polyethylene (HDPE), low density polyethylene (LDPE), linear low density polyethylene (LLDPE), EVA, or EMA.

Homopolymer or Random Copolymer Polypropylene

Polypropylene homopolymer or propylene/ethylene random copolymer may optionally be present in an amount between 0.01-15% by weight, preferably 0.01-10% by weight, of the total composition. The melt flow of the polymer may be between 0.1-100 g/10 min at 2.16 kg/230° C. according to ISO 1133-2 (Dec. 1, 2011). The added polymer preferably has very low crystallinity Additives Further, a variety of conventional additives used in the art may be incorporated into the composition described above to increase processability or enhance properties of the final molded parts. Such additives may include one or more selected from the group consisting of antioxidants, nucleating agents, anti-scratch additives, stabilizers, UV stabilizers, compatibilizers, colorants, polyamide 6, clarifiers, dispersants, blowing agents and any combination thereof. Additives such as dispersing agents and lubricants may also be present. Catalyst deactivators are also commonly used, such as calcium stearate, hydrotalcite, calcium oxide, or other acid neutralizers. One or more additives may be present in an amount from 0.001-8.0% by weight, preferably 0.001-6% by weight, of the weight of the total composition.

Additive and stabilizer packages contain common ingredients well known in the art. Primary and secondary antioxidants are present in the composition in small amounts less than or equal to 0.75% by weight. Suitable antioxidants may include steric hindered phenolics antioxidants (Irganox 1010 and Irganox 1076, BASF) and phosphite antioxidants such as Irgafos 168, also made by BASF. Hindered Amine Light Stabilizers (HALS) may be present in various products such as those in the Cyasorb UV family (Cyasorb UV-3346, Cyasorb UV-3853S) and Chimassorb 905 or Chimassorb 944. HALS are present in very small amounts such as less than or equal 0.25% by weight of the total composition.

Processing

The composition disclosed above can be produced in a batch or continuous mixing operation. Generally, the ingredients with the exception of the filler are dry mixed and put into a feedthroat. Glassy or mineral fillers are side fed downstream. Extruders having a variety of screw configurations such as a single screw or a twin screw configuration can be used to produce the composition. Twin screw extruders can have either a co-rotating or counter-rotating screw. Preferably, a co-rotating twin screw extruder is used such as one commercially available from Coperion with headquarters in Stuggart, Germany.

Extruders have various barrel heating zones and other processing parameters that interact with the screw elements to produce a compounded material. The zones are roughly equal in dimensions and are numbered sequentially so that the highest number is closest to the extruding die. The barrel temperatures can be set at temperatures between 340-490° F. Preferably, barrel temperatures are set between 350-420° F., and most preferably 360° F.-390° F. The Die Temperature may be 380-490° F., preferably 380-420° F.

Typically, the output of the extruder is strands that are pelletized for subsequent extrusion or injection molding to produce finished articles and test specimens. Compounds may be produced on a variety of polymer melt mixing equipment well known in the industry.

Molded Article

In a second embodiment, a molded article is produced from the composition described above.

The term "molded article" describes an article made by a molding process. Possible molding processes may include blow molding, injection molding, injection stretch molding, thermoforming, and profile extrusion. Other examples include gas-assisted injection molding, extrusion blow molding, injection blow molding, injection stretch blow molding, compression molding, rotational molding, foam molding, sheet extrusion, and profile extrusion. These molding processes are well known to one of ordinary skill in the art.

Molded articles may vary in thickness depending on the intended application. However, parts with a thickness greater than 254 μm (0.010 inches) up to 5 cm are usually suitable, preferably the molded article has a thickness of 750 μm to 1 cm, more preferably 1200 μm to 5 mm.

The composition described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

It is understood by one of ordinary skill in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

The molded article may have a flexural modulus between 100-1000 MPa according to ISO 178-13 (Dec. 15, 2010 with Amendment 1 from Apr. 1, 2013). The flexural modulus is preferably 100-800 MPa. The molded article may also have a Shore D Hardness of less than or equal to 50 according to ISO 868 (Mar. 1, 2003). The Shore D Hardness is preferably less than 45 and more preferably less than 40. The molded article may have a ratio of flexural modulus (MPa) to Shore D hardness between 4 and 20, preferably 4-18, more preferably 4-15.

The molded article may have a static coefficient of friction between 0.1-0.7, preferably 0.2-0.6, and more preferably 0.25-0.45 according to ISO 8295 (Oct. 1, 1995). The molded article may have a dynamic coefficient of friction between 0.05-0.6, preferably 0.05-0.4, and more preferably 0.1-0.3 according to ISO 8295 (Oct. 1, 1995).

The molded article may have a tensile strength between 5-25 MPa, preferably 10-20 MPa according to ISO 527-1 (Jun. 15, 1993).

Articles fabricated from the invention may include automotive parts such as interior trim parts such as door panels, consoles, instrument panels, seat closures, and knee bolsters. Non-automotive parts include chair arms, seat backs, table edges, grips, handles, and other articles that are frequently touched or desired to have a soft or warm touch.

EXAMPLES

The following examples illustrate the present invention. It is understood that these examples are given for the purpose of illustration and do not limit the invention. In the examples, all parts and percentages are by weight based on the total weight of the composition unless otherwise specified.

Examples 1-7 and Comparative Examples 1-4

A polymeric composition was prepared by melt mixing the components shown in Table 1 using a twelve barrel, 28 mm screw diameter Coperion co-rotating twin screw extruder. The composition was made with barrel temperatures of about 190-210° C. and strand pelletized.

The composition was then formed into a molded article for testing. Articles were produced on a 90 Ton Toshiba molding machine according to ISO 294-1 (2005) and more specifically ISO 1873-2 (2007) (propylene specific).
Methods for Measuring the Properties Tensile strength was measured according to ISO 527-1 (Jun. 15, 1993).

Flexural modulus was determined using ISO 178 (Dec. 15, 2010 with Amendment 1 dated Apr. 1, 2013).

Shore D hardness was measured according to ISO 868 (Mar. 1, 2003).

The static and dynamic coefficient of friction was measured according to ISO 8295 (Oct. 1, 1995).

Haptics testing was conducted by trained subjects. On 5 mm thick 4 inch×6 inch plaques, subjects were asked to drag their index finger along the test surface of the plaque for 5 cm, paying attention to the softness of the surface. Each test specimen was given a rating of "A" (acceptable), "E" (excellent), or "U" (unacceptable). Samples were rated (U) unacceptable if they felt too hard, had too much friction, felt tacky, or exhibited stick/slip behavior. Samples were rated as (A) acceptable if they were of appropriate softness and pleasant to the touch. Samples were rated as excellent (E) if they not only met the criteria for acceptable but had a more luxurious feel.

Table 2 provides the properties of the compounds from Table 1.

Additive/Stabilizer Package A in Table 1 includes 0.75 g Hindered Amine Light Stabilizers, 0.30 g antioxidants, and 1.0 g of a Carbon Black masterbatch. Additive/Stabilizer Package B in Table 1 contains 0.2 g phenolic antioxidant, 0.1 g phosphite antioxidant, 0.2 g polypropylene flake (for easier feeding) and 3-5 g of a scratch additive such as Tegomer H Si 6440P or Tegomer Anti-Scratch 100 produced by Evonik, Irgasurf SR 100B from BASF, or Erucamid.

TABLE 1

|  |  | IE 1 | IE 2 | IE 3 | IE 4 | IE 5 | IE 6 | IE 7 | CE 1 | CE 2 | CE 3 | CE 4 |
|---|---|---|---|---|---|---|---|---|---|---|---|---|
| Adflex Q200F | Heterophasic Copolymer |  | 27.19 | 48.14 | 47.40 | 24.96 | 24.96 |  |  | 34.00 |  |  |
| Adflex KS 084P | Heterophasic Copolymer |  |  |  |  |  |  | 62.00 |  |  |  | 44.00 |
| Hifax CA 10 A | Heterophasic Copolymer | 61.95 |  |  |  |  |  |  |  | 37.95 | 31.97 |  |
| Formosa Formolene 4100T | Polypropylene Homopolymer |  |  |  |  |  |  |  |  |  |  | 15.5 |
| RP250 Random PCO, 35MFR | PP Random Copolymer |  |  |  |  |  |  | 12.25 |  |  |  |  |
| Braskem PP TR3350C | PP Random Copolymer |  |  |  |  |  |  |  | 37.95 |  | 21.32 |  |
| DOW Engage 8100 | Ethylene-Octene Elastomer |  | 9.43 | 17.36 | 17.10 | 8.66 | 8.66 | 7.25 |  |  | 19.20 | 7.00 |

TABLE 1-continued

|  |  | IE 1 | IE 2 | IE 3 | IE 4 | IE 5 | IE 6 | IE 7 | CE 1 | CE 2 | CE 3 | CE 4 |
|---|---|---|---|---|---|---|---|---|---|---|---|---|
| DOW Infuse 9807 | Olefin Block Copolymer |  |  |  |  |  | 35.88 |  |  |  |  |  |
| Versify 4301 | Propylene/Ethylene Elastomer | 10.00 | 35.88 |  |  |  |  |  |  | 34.00 |  |  |
| Kraton G1652M | HSEBS Elastomer |  |  | 7.00 |  |  |  |  |  |  |  |  |
| Kraton G4609H | Oil Extended SEBS |  |  |  |  | 35.88 |  |  |  |  |  |  |
| Polybond 3200 | Grafted maleic anhydride PP | 1.00 | 1.00 | 1.00 | 2.00 | 1.00 | 1.00 | 1.00 | 1.00 | 1.00 | 1.00 | 1.00 |
| 13 micron glass fiber | General Purpose Polypro Glass Fiber | 25.00 | 25.00 | 25.00 | 25.00 | 25.00 | 25.00 | 12.00 | 25.00 | 25.00 | 25.00 | 25.00 |
| Additive/Stabilizer Package A | Stabilizer Package A | 2.05 |  |  |  |  |  |  | 2.05 | 2.05 |  |  |
| Additive/Stabilizer Package B | Stabilizer Package B |  | 1.50 | 1.50 | 1.50 | 1.50 | 1.50 | 1.50 |  |  | 1.50 | 1.50 |
| Scratch Additive | Scratch Additive |  |  |  |  | 3.00 | 3.00 | 3.00 |  |  |  | 5.00 |
| LV Prime Nylon 6 | Nylon 6 |  |  |  | 7.00 |  |  |  |  |  |  |  |

TABLE 2

|  |  |  | IE 1 | IE 2 | IE 3 | IE 4 | IE 5 | IE 6 | IE 7 | CE 1 | CE 2 | CE 3 | CE 4 |
|---|---|---|---|---|---|---|---|---|---|---|---|---|---|
| Tensile Strength | ISO 527 | MPa | 20 | 20.0 | 17.95 | 20.0 | 11.3 | 5.9 | 20.4 | 37.5 | 17.9 | 25.1 | 31.4 |
| Flex Modulus Chord | ISO 178 | MPa | 716.6 | 460.9 | 486.2 | 627.6 | 246 | 130 | 827 | 2264 | 1290 | 1306 | 1690 |
| Hardness (Shore D) | ISO 868 |  | 45 | 45 | 40 | 45 | 34 | 30 | 49 | 60 | 52 | 55 | 57 |
| Static Coefficient of Friction | ISO 8295 |  | 0.36 | 0.39 | 0.39 | 0.35 | 0.37 | 0.32 | 0.43 | 0.42 | 0.32 | 0.34 | 0.36 |
| Dynamic Coefficient of Friction | ISO 8295 |  | 0.06 | 0.1 | 0.14 | 0.08 | 0.11 | 0.06 | 0.11 | 0.06 | 0.06 | 0.2 | 0.1 |
| Flex Mod(MPa)/ShD |  |  | 15.9 | 10.2 | 12.2 | 13.9 | 7.2 | 4.3 | 16.9 | 37.7 | 24.8 | 23.7 | 29.6 |
| Total Elastomer Content |  |  | 53.4% | 64.3% | 58.1% | 50.3% | 62.0% | 62.0% | 50.7 | 34.0% | 50.4% | 41.6% | 37.8% |
| Haptics Rating |  |  | A | E | E | E | A | E | A | U | U | U | U |

Comparative Example 1 does not include any heterophasic copolymer. Despite having a significant amount of elastomer, Comparative Example 1 was too hard with a Shore D hardness of 60 to be a valid composition. Comparative Example 2 had a large amount of heterophasic copolymer but did not contain any additional elastomeric component. As such, flexural modulus and Shore D hardness were too high, resulting in an unacceptable haptics rating. Comparative Example 3 included both the heterophasic copolymer and additional elastomeric component and acceptable amounts of the coupling agent and reinforcement material but also includes random copolymer as more than 15% of the total weight of the composition. As such, Comparative Example 3 is too hard. Comparative Example 4 also includes heterophasic copolymer, additional elastomeric component, the coupling agent, and reinforcement material but contains too much homopolymer, making the material too stiff and results in an unacceptable haptics rating.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable one of ordinary skill in the art to utilize the invention and various embodiments with various modifications as are suited to the particular use contemplated. It is intended that the scope of the invention be defined by the claims appended hereto and their equivalents.

The invention claimed is:

1. A polymeric composition with a soft-touch feel, comprising a blend of:
   a. one or more heterophasic copolymers of propylene and ethylene produced by a multistep polymerization, wherein the heterophasic copolymers comprise a low crystalline matrix component and a soft amorphous elastomeric component, in which both the matrix component and the soft amorphous elastomeric component contain greater than 55% by weight propylene;
   b. one or more additional elastomeric components selected from the group consisting of:
      i. an ethylene/α-olefin $C_3$-$C_{20}$ copolymer with a total ethylene concentration of greater than or equal to 65% by weight; and
      ii. a propylene/α-olefin $C_2$, $C_4$-$C_{20}$ copolymer with a total propylene concentration of greater than or equal to 65% by weight;
   c. 5-65% by weight of the total composition of one or more inorganic or organic reinforcement materials, wherein the reinforcement material is 5-40% by weight of the total composition of glass and any remainder, if present, of the reinforcement material is one or more organic reinforcement material or one or more inorganic reinforcement material selected from the group consisting of talc, wollastonite, and minerals; and
   d. 0.01-4% by weight of the total composition of a maleic anhydride grafted polypropylene compatiblizer or coupling agent;
   e. wherein the polymeric composition has a total crystallinity of less than 30 J/gram measured by differential scanning calorimetry; and
   f. wherein the total elastomer content of the polymeric composition is greater than 50% by weight and the overall polymeric composition has an ethylene concentration of greater than 10% by weight;
wherein the composition has a:
a. flexural modulus between 100-1000 MPa according to ISO 178; and
b. Shore D Hardness less than or equal to 45 according to ISO 868.

2. The composition of claim 1, wherein at least one heterophasic copolymer is a reactor thermoplastic polyolefin.

3. The composition of claim 1, wherein the reinforcement material further comprises an organic fiber and optionally contains one or more mineral fillers.

4. The composition of claim 1, wherein the component (b) further comprises at least one selected from the group consisting of styrenic elastomers, hydrogenated styrenic ethylene/butadiene copolymers, ethylene-styrene interpolymers, styrenic diblock, triblock, star-block copolymers, HSEBS, SEBS, and HSEPS.

5. The composition of claim 1, wherein 0.001-8% by weight of the total composition is made up of one or more additives selected from the group consisting of antioxidants, nucleating agents, anti-scratch additives, stabilizers, UV stabilizers, compatibilizers, polypropylene grafted maleic anhydride coupling agents, colorants, polyamide 6, clarifiers, dispersants, and blowing agents.

6. The composition of claim 5, wherein the content of the one or more additives is 0.001-6% by weight of the total composition.

7. The composition of claim 1, wherein the composition comprises 0.01-15% by weight of a propylene homopolymer or random copolymer based on the total weight of the composition.

8. The composition of claim 1, wherein the component (a) is present as 10-90% by weight of the total weight of the polymer composition.

9. The composition of claim 1, wherein the component (a) is present as 15-75% by weight of the total weight of the polymer composition.

10. The composition of claim 1, wherein the component (a) is present as 25-70% by weight of the total weight of the polymer composition.

11. The composition of claim 1, wherein the component (b) is present at 5-60% by weight of the total weight of the polymer composition.

12. The composition of claim 1, wherein:
i. the ethylene/α-olefin $C_3$-$C_{20}$ copolymer has a total ethylene concentration of greater than or equal to 80% by weight; and
ii. the propylene/α-olefin $C_2$, $C_4$-$C_{20}$ copolymer has a total propylene concentration of greater than or equal to 80% by weight.

13. A molded article produced from the composition of claim 1.

14. The molded article of claim 13, wherein the article has a ratio of flexural modulus (MPa)/Shore D hardness between 4 and 20.

15. The molded article of claim 13, wherein the article has a static coefficient of friction between 0.1 and 0.7 and a dynamic coefficient of friction between 0.05-0.6 according to ISO 8295.

16. The composition of claim 1, wherein, when the composition is formed into a molded article, the molded article has a ratio of flexural modulus (MPa)/Shore D hardness between 4 and 20.

17. The composition of claim 1, wherein, when the composition is formed into a molded article, the molded article has a static coefficient of friction between 0.1 and 0.7 and a dynamic coefficient of friction between 0.05-0.6 according to ISO 8295.

18. A polymeric composition, comprising a blend of:
a. one or more heterophasic copolymers of propylene and ethylene produced by a multistep polymerization, wherein the heterophasic copolymers comprise a low crystalline matrix component and a soft amorphous elastomeric component, in which both the matrix component and the soft amorphous elastomeric component contain greater than 55% by weight propylene;
b. i. an ethylene/α-olefin $C_3$-$C_{20}$ copolymer with a total ethylene concentration of greater than or equal to 65% by weight; and
ii. optionally a propylene/α-olefin $C_2$, $C_4$-$C_{20}$ copolymer with a total propylene concentration of greater than or equal to 65% by weight;
c. 5-65% by weight of the total composition of one or more inorganic or organic reinforcement materials; and
d. 0.01-4% by weight of the total composition of a maleic anhydride grafted polypropylene compatiblizer or coupling agent;
e. wherein the polymeric composition has a total crystallinity of less than 30 J/gram measured by differential scanning calorimetry; and
f. wherein the total elastomer content of the polymeric composition is greater than 50% by weight and the overall polymeric composition has an ethylene concentration of greater than 10% by weight; and
g. wherein the composition has a Shore D Hardness less than or equal to 45 according to ISO 868.

19. A molded article produced from the composition of claim 18.

* * * * *